(12) United States Patent
Way et al.

(10) Patent No.: US 10,791,436 B2
(45) Date of Patent: Sep. 29, 2020

(54) SYSTEMS AND METHODS FOR A VEHICLE APPLICATION PROGRAMMING INTERFACE

(71) Applicant: UATC, LLC

(72) Inventors: Matthew James Way, Pittsburgh, PA (US); Chee Yu, Dublin, CA (US); Steve Ayers, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 60 days.

(21) Appl. No.: 15/896,276

(22) Filed: Feb. 14, 2018

(65) Prior Publication Data

US 2019/0110174 A1 Apr. 11, 2019

Related U.S. Application Data

(60) Provisional application No. 62/570,955, filed on Oct. 11, 2017.

(51) Int. Cl.
*H04W 4/40* (2018.01)
*H04W 76/10* (2018.01)
(Continued)

(52) U.S. Cl.
CPC ............... *H04W 4/40* (2018.02); *H04L 45/24* (2013.01); *H04L 47/24* (2013.01); *H04L 67/12* (2013.01);
(Continued)

(58) Field of Classification Search
CPC ........... H04W 4/90; H04W 4/70; H04W 4/44; H04W 4/40; H04W 76/10; H04L 67/02; H04L 67/12; G05D 1/0088
See application file for complete search history.

(56) References Cited

U.S. PATENT DOCUMENTS 8,601,595 B2 12/2013 Gelvin et al.
9,014,888 B2 4/2015 Sukkarié et al.
(Continued)

FOREIGN PATENT DOCUMENTS

WO WO 2017026992 2/2017

OTHER PUBLICATIONS

Search Report and Written Opinion for PCT/US2019/015665 dated Apr. 18, 2019, 14 pages.
(Continued)

*Primary Examiner* — Kim T Nguyen
(74) *Attorney, Agent, or Firm* — Dority & Manning, PA

(57) ABSTRACT

Systems and methods are directed to communication between a vehicle and an entity infrastructure. In one example, a computer-implemented method for facilitating communication from and to a vehicle includes obtaining, by a computing system comprising one or more computing devices, a request to establish communication from a vehicle computing system. The method further includes establishing, by the computing system, one or more bidirectional communication connections to the vehicle computing system. The method further includes receiving, by the computing system, one or more messages over the one or more communication connections to the vehicle computing system. The method further includes determining, by the computing system, routing for the one or more received messages. The method further includes providing, by the computing system, the one or more messages to one or more clients based at least in part on the determined routing.

20 Claims, 4 Drawing Sheets

(51) Int. Cl.
  *H04W 12/06*    (2009.01)
  *H04L 12/707*   (2013.01)
  *H04L 12/851*   (2013.01)
  *H04L 29/08*    (2006.01)
  *G05D 1/00*     (2006.01)
  *H04W 4/44*     (2018.01)
  *H04W 4/029*    (2018.01)

(52) U.S. Cl.
  CPC ............ *H04L 67/28* (2013.01); *H04W 12/06* (2013.01); *H04W 76/10* (2018.02); *G05D 1/0088* (2013.01); *H04L 67/02* (2013.01); *H04L 67/2833* (2013.01); *H04W 4/029* (2018.02); *H04W 4/44* (2018.02)

(56) References Cited

U.S. PATENT DOCUMENTS

| | | | |
|---|---|---|---|
| 9,459,622 B2 | 10/2016 | Abhyanker | |
| 9,547,309 B2 | 1/2017 | Ross et al. | |
| 9,547,985 B2 | 1/2017 | Tuukkanen | |
| 9,606,794 B1 | 3/2017 | Chou et al. | |
| 2003/0014521 A1 | 1/2003 | Elson et al. | |
| 2009/0077267 A1* | 3/2009 | Alrabady | H04L 67/34 709/249 |
| 2010/0210316 A1* | 8/2010 | Okayasu | H04M 1/6091 455/569.2 |
| 2011/0122854 A1* | 5/2011 | De Lind Van Wijngaarden | H04L 12/5692 370/338 |
| 2012/0011067 A1 | 1/2012 | Katzin et al. | |
| 2012/0089684 A1* | 4/2012 | Angus | H04L 47/22 709/206 |
| 2015/0339928 A1 | 11/2015 | Ramanujam | |
| 2017/0078398 A1 | 3/2017 | Haidar et al. | |
| 2017/0178504 A1 | 6/2017 | Gotoh et al. | |
| 2017/0255966 A1 | 9/2017 | Khoury | |
| 2017/0264688 A1* | 9/2017 | Sell | H04L 67/12 |
| 2018/0053141 A1 | 2/2018 | Shydo, Jr. | |
| 2018/0097804 A1 | 4/2018 | Boehm | |
| 2018/0189917 A1 | 7/2018 | Shen et al. | |
| 2018/0350160 A1 | 12/2018 | Sainaney et al. | |
| 2019/0025819 A1 | 1/2019 | Ferguson et al. | |

OTHER PUBLICATIONS

PCT International Search Report and Written Opinion for PCT/US2018/055127, dated Jan. 29, 2019, 15 pages.

International Search Report and Written Opinion for Application No. PCT/US2019/043664, dated Sep. 12, 2019, 13 pages.

\* cited by examiner

SYSTEMS AND METHODS FOR A VEHICLE APPLICATION PROGRAMMING INTERFACE

This application claims the benefit of U.S. Provisional Application No. 62/570,955, filed Oct. 11, 2017, which is incorporated herein by reference.

FIELD

The present disclosure relates generally to operation of an autonomous vehicle. More particularly, the present disclosure relates to systems and methods that provide for communications between autonomous vehicles and a provider infrastructure.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on data collected by the sensors. This can allow an autonomous vehicle to navigate without human intervention and, in some cases, even omit the use of a human driver altogether.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for facilitating communication from and to a vehicle. The method includes obtaining, by a computing system comprising one or more computing devices, a request to establish communication from a vehicle computing system. The method further includes establishing, by the computing system, one or more bidirectional communication connections to the vehicle computing system. The method further includes receiving, by the computing system, one or more messages over the one or more communication connections to the vehicle computing system. The method further includes determining, by the computing system, routing for the one or more received messages. The method further includes providing, by the computing system, the one or more messages to one or more clients based at least in part on the determined routing.

Another example aspect of the present disclosure is directed to a computing system. The computing system includes one or more processors; and one or more memories including instructions that, when executed by the one or more processors, cause the one or more processors to perform operations. The operations include obtaining a request to establish communication from a vehicle computing system. The operations further include establishing one or more bidirectional communication connections to the vehicle computing system. The operations further include receiving one or more messages over the one or more communication connections to the vehicle computing system. The operations further include determining routing for the one or more received messages. The operations further include providing the one or more messages to one or more clients based at least in part on the determined routing.

Another example aspect of the present disclosure is directed to a system including one or more autonomous vehicles and an operations computing system. The one or more autonomous vehicles includes a vehicle computing system which includes one or more processors; and one or more memories including instructions that, when executed by the one or more processors, cause the one or more processors to perform operations. The operations include sending a request to establish communication to the operations computing system. The operations further include establishing one or more bidirectional communication connections to the operations computing system. The operations further include determining priorities for one or more messages. The operations further include sending the one or more messages over the one or more communication connections to the operations computing system. The operations computing system includes one or more processors; and one or more memories including instructions that, when executed by the one or more processors, cause the one or more processors to perform operations. The operations include obtaining the request to establish communication from the vehicle computing system. The operations further include establishing one or more bidirectional communication connections to the vehicle computing system. The operations further include receiving the one or more messages over the one or more communication connections to the vehicle computing system. The operations further include determining routing for the one or more received messages. The operations further include providing the one or more messages to one or more clients based at least in part on the determined routing.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
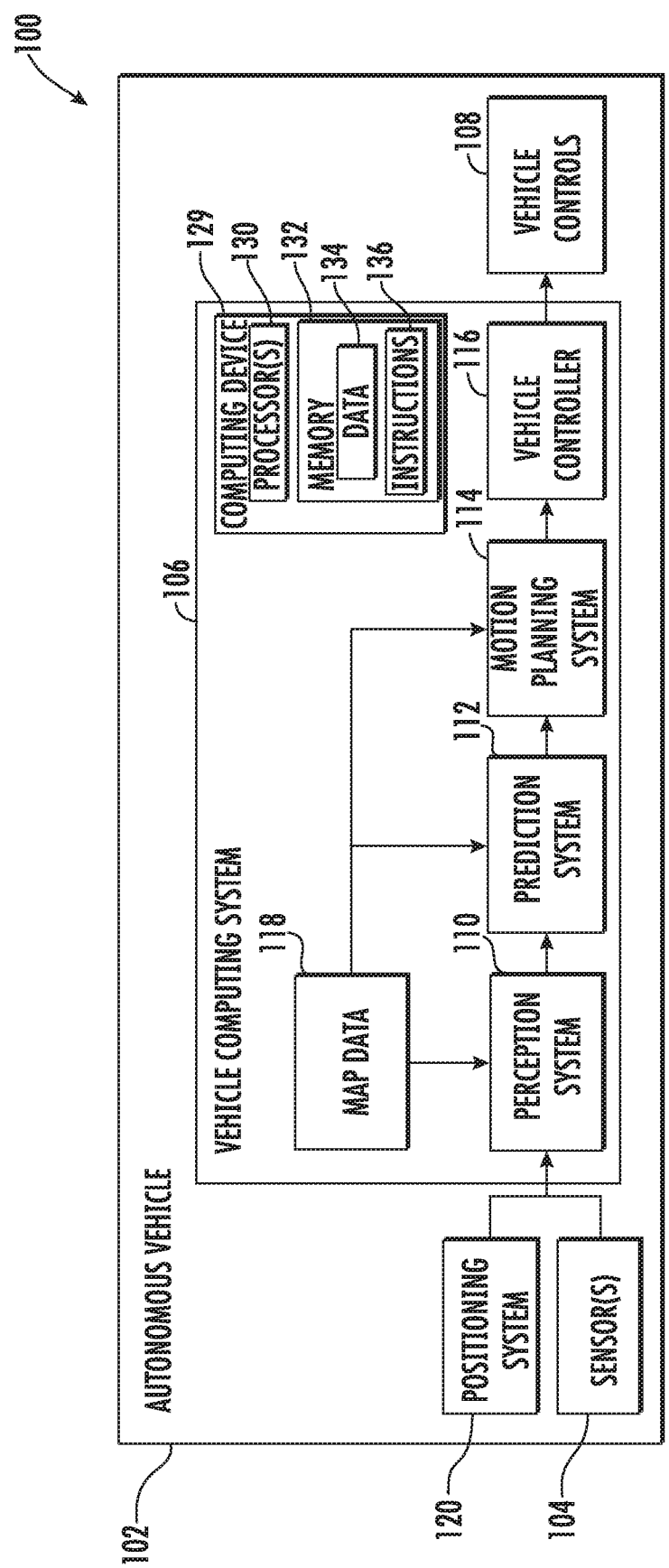
FIG. 1 depicts a block diagram of an example system for controlling the navigation of an autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to communication between vehicles in a fleet and an entity infrastructure, for example, a service provider's operations or control center. In particular, the systems and methods of the present disclosure can facilitate secure, bidirectional communications between one or more vehicles in a service provider's fleet and the service provider's operations or control center. The systems and methods of the present disclosure can provide for dynamically prioritizing and/or de-prioritizing communication traffic, for example, based on classifying the data and/or in response to issues such as network conditions (e.g., link degradation, etc.). Additionally, the systems and methods of the present disclosure can provide for accessing of vehicle data by one or more infrastructure endpoints (e.g., system clients, applications, databases, etc.), as well as provide for relaying messages (e.g., command/control messages, alerts, advisories, etc.) from one or more clients to one or more vehicles.

In particular, according to aspects of the present disclosure, a vehicle application programming interface (Vehicle API) platform can provide for a translation/transport layer as an interface between vehicle computing systems onboard vehicles within an entity's fleet and one or more remote clients and/or applications (e.g., fleet reporting, fleet management, fleet services/maintenance, remote vehicle assistance, routing, scheduling, etc.) operating within the entity's operations/control center. For example, the Vehicle API platform can receive data from a vehicle over a communications pipeline established between the Vehicle API and the vehicle and provide for different means of classifying the data, writing the data consistently on different messaging protocols, and providing a platform that can aggregate data for other clients/applications in consistent ways. The Vehicle API platform can provide for communicating vehicle data to the operations/control center in a secure manner that allows for expanded processing of vehicle data off the vehicle, analyzing such data in real time, and/or the like. According to example aspects of the present disclosure, a Vehicle API platform can be vehicle agnostic, allowing for any autonomous vehicle and/or compute-capable vehicle to interact with an entity's operations/control center by providing a consistent communication pipeline that any vehicle computing system would be able to use to report vehicle data (e.g., telemetry, video, etc.) and/or receive messages (e.g., command/control messages, configuration messages, alerts, advisories, etc.) from one or more clients (e.g., fleet reporting, fleet management, fleet services/maintenance, remote vehicle assistance, routing, scheduling, etc.) associated with an entity's operations system.

More particularly, an entity (e.g., service provider, owner, manager) can use one or more vehicles (e.g., ground-based vehicles) to provide a vehicle service such as a transportation service (e.g., rideshare service), a courier service, a delivery service, etc. The vehicle(s) can be autonomous vehicles that include various systems and devices configured to control the operation of the vehicle. For example, an autonomous vehicle can include an onboard vehicle computing system for operating the autonomous vehicle (e.g., located on or within the autonomous vehicle). The vehicle computing system can receive sensor data from sensor(s) onboard the vehicle (e.g., cameras, LIDAR, RADAR), attempt to comprehend the vehicle's surrounding environment by performing various processing techniques on the sensor data, and generate an appropriate motion plan through the vehicle's surrounding environment. Moreover, the autonomous vehicle can be configured to communicate with one or more computing devices that are remote from the vehicle. For example, the autonomous vehicle can communicate with an operations computing system that can be associated with the entity. The operations computing system can help the entity monitor, communicate with, manage, etc. the fleet of vehicles.

In particular, according to example aspects of the present disclosure, the systems and methods of the present disclosure can provide a Vehicle API platform that can provide the ability for a service provider (e.g., an operations computing system) to communicate bidirectionally with any type of autonomous or compute-capable vehicle. The Vehicle API platform can provide a more complex understanding of the vehicle data, for example, understanding the reason it is receiving/sending this data, understanding how different messages weigh against each other, and/or the like. In some implementations, the Vehicle API platform can provide for intelligently handling degraded communication situations between a vehicle and a service provider's operations system, for example, by understanding the types of messages and prioritizing messages appropriately based on the current network conditions. In some implementations, the Vehicle API platform can provide for dynamically prioritizing and/ or de-prioritizing data (e.g., vehicle messages) to provide for more efficiently transmitting the data.

According to an example aspect of the present disclosure, a Vehicle API platform can provide for prioritizing vehicle data for communication on board a vehicle. For example, the Vehicle API platform can provide for client software (e.g., a Vehicle API client) onboard an autonomous vehicle and/or compute capable vehicle that can provide for communicating data using intelligent quality of service (QoS), multiplexing data over different communication streams, prioritizing and/or de-prioritizing data traffic dynamically, for example, based on link conditions (e.g., in a poor connection state, sending critical/important data first and sending other data when possible) and/or the like. In some implementations, the Vehicle API platform (e.g., via the Vehicle API client) can allow for the vehicle to make determinations about what data it thinks is more important and handling the communication of that data as appropriate.

The Vehicle API platform can also provide for prioritizing communications on the offboard side (e.g., at the service provider operations center). For example, in some implementations, when receiving a large amount of traffic, such as messages from a large number of vehicles, the Vehicle API platform can understand the importance level of different messages and handle them appropriately, such as by classifying messages like requests for control/assistance as being more important than diagnostic information or traffic information, for instance.

According to an aspect of the present disclosure, the Vehicle API platform can provide for establishing communication tunnels between a vehicle and the service provider system. In some implementations, the Vehicle API platform can establish multiplexing connections between the vehicle and the service provider system that can be used to send arbitrary communications through the same connection. For example, in some implementations, the Vehicle API platform can provide for establishing multiple Hypertext Transfer Protocol Version 2 (HTTP/2) and/or other suitable protocol connections between a vehicle and the service provider system, allowing the ability to parallelize and assert traffic priority within a connection. In some implementations, the Vehicle API platform can establish at least two HTTP/2 and/or other suitable protocol connections to the service provider system from a vehicle, where at least one connection can be dedicated to high reliability, high deliverability traffic and at least one connection can be dedicated to best-effort, unguaranteed traffic. In some implementations, the use of multiple connections can allow for the underlying transport to be controlled in terms of different connections having different weights such that data can be identified as more important.

In some implementations, the Vehicle API platform can dynamically prioritize and/or de-prioritize data traffic based on current conditions, such as network conditions. For example, in some implementations, if a vehicle is trying to transmit data and the communications keep failing, the Vehicle API platform can provide for prioritization based on type or messages, for instance, determining that some messages are less important because they are old in time, and/or that particular messages are more important in time because it has to be sent, and modifying the prioritization based on these determinations.

In some implementations, the Vehicle API platform can prioritize and/or de-prioritize data traffic (e.g., messages) based on patterns of communication with a vehicle. For instance, in some implementations, the Vehicle API platform can identify a nominal rate of communication and a nominal cadence for messages. If the Vehicle API platform is not seeing that nominal communication and cadence from a vehicle, and depending on how prolonged it is, the severity of it, and/or the like, the Vehicle API platform can change behavior regarding those vehicle messages, such as to prioritize them differently, flag them differently, and/or the like. As an example, based on the frequency that a vehicle communicates with the Vehicle API platform, it may determine there is a communication problem, for example, if a vehicle is sending data, then it drops off, then starts sending data, then drops off (e.g., choppy communication). The Vehicle API platform can then determine that the messages from that vehicle may be a higher priority because the vehicle is having trouble sending data.

In some implementations, the Vehicle API platform can provide for aggregating data from multiple vehicles allowing for an understanding of what the vehicles are doing in that particular moment in time. For example, in some implementations, the Vehicle API platform can provide for aggregating data from a vehicle to allow for determining what a particular vehicle is doing, to allow for tracking vehicle in real time, and/or the like. In some implementations, the Vehicle API platform can provide for streaming real time data from a vehicle, for example, providing a live stream of telemetry data from a vehicle to an operations system to allow for providing assistance to the vehicle. In some implementations, by providing for aggregating vehicle data, the Vehicle API platform can facilitate understanding of what all the vehicles are in a fleet, who they belong to, what they are doing, providing a history for some time window into the behavior of a vehicle, providing moving snapshots of vehicle data over time, and/or the like, for example.

In some implementations, Vehicle API platform can allow for the service provider system to provide multiple types of data to a vehicle over the established connections to the vehicle. For example, in some implementations, the Vehicle API platform can provide for sending high level assignment data to a vehicle, such as instructions for a vehicle to offload the data from its computing system, instructions for a vehicle to report for maintenance, instructions for a vehicle to procure fuel, and/or the like. In some implementations, the Vehicle API platform can provide for sending emergency commands to a vehicle, for example, instructing the vehicle to immediately stop in an emergency or critical situation. In some implementations, the Vehicle API platform can provide for sending specific control messages to a vehicle, for example, instructing the vehicle to go to certain coordinates. In some implementations, the Vehicle API platform can provide for sending advisories to vehicles, for example, flagging particular geo regions, such as areas to avoid, areas to spend more time in to acquire passengers, areas under construction that should be routed around, and/or the like. In some implementations, such advisories can be developed based on the Vehicle API aggregating data for multiple vehicles within a fleet.

In some implementations, Vehicle API platform can allow for a vehicle to send multiple types of data to the service provider system over the established connections with the vehicle. For example, in some implementations, the Vehicle API platform can provide for a vehicle sending a request for assistance to the service provider system, such as in emergency or critical situations. In some implementations, the Vehicle API platform can provide for a vehicle to send low resolution perception data, such as labels and/or geometries, to the service provider system, allowing for processing the data offboard the vehicle and developing better understanding of the world. In some implementations, the Vehicle API platform can provide for a vehicle to send data such as current vehicle pose (e.g., global and relative to map), vehicle trajectory, onboard diagnostics, and/or the like, to the service provider system, for example.

In some implementations, the Vehicle API platform can include, employ, and/or otherwise leverage a model, such as a machine-learned model. For example, the machine-learned model can be or can otherwise include one or more various model(s) such as, for example, neural networks (e.g., deep neural networks), or other multi-layer non-linear models. Neural networks can include recurrent neural networks (e.g., long, short-term memory recurrent neural networks), feed-forward neural networks, convolutional neural networks, and/or other forms of neural networks.

In particular, according to example aspects of the present disclosure, the Vehicle API platform can provide for using one or more machine-learned models to understand better how to handle messages efficiently. For instance, the machine-learned model can allow for the Vehicle API platform to earn how to deal with different types of messages it is not used to seeing. As one example, in some implementations, the Vehicle API platform may be more open-ended and not require a vehicle to have an exact format for messages. The Vehicle API platform can provide for a specific format of the outer envelope of a message with the data inside the message being formatted by the vehicle. Through the use of machine-learned models, the Vehicle API platform can learn to be more intelligent about recognizing different types of data from a vehicle (e.g., the data generally looks like vehicle pose data, etc.) and determining how to handle the messages appropriately.

In some implementations, the machine-learned model can be trained using a two-step approach. In a first stage, supervised learning can be performed where a separate control path (e.g., a learning path that is not actionable) can provide for receiving live data for training the model(s). The models can receive the live data and generate output determinations. Comparisons can then be performed based on the control patterns and what the model(s) provide as output and train the model(s). In a second phase, the model(s) can perform the primary evaluation of the data to produce output, and then the model output would be compared to the control path. Once the model(s) achieve certain levels of confidence, the control path can be phased out and the model(s) can be relied on more heavily In some implementations, the machine-learned model(s) can provide one or more types of output, such as data routing, classifying messages, determining correct message priority, and/or the like, for example. For instance, in some implementations, a machine-learned model can be a routing model. The model can understand that a particular system needs to get a particular piece of data. The model can classify the different messages that are received, learning form the ones that are expected to be seen and comparing unexpected messages (e.g., new messages that have not been seen where routing is not necessarily known) against the expected messages to learn how the unexpected messages should be routed.

In some implementations, the Vehicle API platform can provide for one or more authentication schemes that gates access to a service provider's system from the public world. For example, the Vehicle API platform can provide for vehicles from other OEMs (e.g., vehicles not specifically designed/manufactured for the service provider) to access the service provider's system by using the same communication protocols and connecting to the same endpoints, for example, using published documentation, once the vehicle has been authenticated.

In some implementations, the Vehicle API platform can provide secure communications between vehicles and the service provider system. For example, the Vehicle API platform can provide one or more security protocols where all clients will require authentication prior to establishing communication with the Vehicle API platform.

The systems and methods described herein provide a number of technical effects and benefits. For instance, the systems and methods can provide for abstracting a vehicle platform from an operations system infrastructure. For example, a Vehicle API platform according to the present disclosure can provide for reasoning about vehicles (e.g., autonomous vehicles and/or compute capable vehicles) more generically such that a service provider can easily introduce different vehicles (e.g., vehicles from different original equipment manufacturers (OEM)) and provide for bidirectional communication with such vehicles, thereby allowing for easier and/or faster expansion of the service provider's fleet.

The systems and methods described herein can also provide technical effects and benefits including providing for quickly aggregating data from a large number of vehicles. For example, in some implementations, the Vehicle API platform can be in communication with a large number of vehicles within a fleet simultaneously and can quickly aggregate data from multiple vehicles to provide for determining current conditions that may affect operation of vehicles within the fleet. The Vehicle API platform can inform one or more vehicles within the fleet based on the aggregated data and provide for quickly adapting to current conditions.

The systems and methods described herein can also provide technical effects and benefits including providing for a decentralized system that can provide increased scalability. For example, the Vehicle API platform can provide an architecture, such as the communication pipelines, message routing and/or the like, that allow for significant scalability in terms of processing and the like to provide for handling any number of vehicles. The Vehicle API platform scalability can also provide for more processing offboard the vehicle allowing for more complex processing of vehicle data than can be done onboard the vehicle.

The systems and methods described herein can also provide resulting improvements to vehicle computing technology tasked with operation of an autonomous vehicle. For example, the Vehicle API platform can provide for increased processing offboard an autonomous vehicle. In some implementations, the Vehicle API platform can allow for moving some types of vehicle computing system processing, such as routing decisions, offboard the vehicle (e.g., performing the processing by an operations computing system). A vehicle computing system can then provide more compute cycles (e.g., CPU time, etc.) for other tasks, such as processing of image data, sensor data, and/or the like, allowing for improved processing.

With reference to the figures, example embodiments of the present disclosure will be discussed in further detail.

FIG. 1 depicts a block diagram of an example system 100 for controlling the navigation of an autonomous vehicle 102 according to example embodiments of the present disclosure. The autonomous vehicle 102 is capable of sensing its environment and navigating with little to no human input. The autonomous vehicle 102 can be a ground-based autonomous vehicle (e.g., car, truck, bus, etc.), an air-based autonomous vehicle (e.g., airplane, drone, helicopter, or other aircraft), or other types of vehicles (e.g., watercraft). The autonomous vehicle 102 can be configured to operate in one or more modes, for example, a fully autonomous operational mode and/or a semi-autonomous operational mode. A fully autonomous (e.g., self-driving) operational mode can be one in which the autonomous vehicle can provide driving and navigational operation with minimal and/or no interaction from a human driver present in the vehicle. A semi-autonomous (e.g., driver-assisted) operational mode can be one in which the autonomous vehicle operates with some interaction from a human driver present in the vehicle.

The autonomous vehicle 102 can include one or more sensors 104, a vehicle computing system 106, and one or more vehicle controls 108. The vehicle computing system 106 can assist in controlling the autonomous vehicle 102. In particular, the vehicle computing system 106 can receive sensor data from the one or more sensors 104, attempt to comprehend the surrounding environment by performing various processing techniques on data collected by the sensors 104, and generate an appropriate motion path through such surrounding environment. The vehicle computing system 106 can control the one or more vehicle controls 108 to operate the autonomous vehicle 102 according to the motion path.

The vehicle computing system 106 can include one or more processors 130 and at least one memory 132. The one or more processors 130 can be any suitable processing device (e.g., a processor core, a microprocessor, an ASIC, a FPGA, a controller, a microcontroller, etc.) and can be one processor or a plurality of processors that are operatively connected. The memory 132 can include one or more non-transitory computer-readable storage mediums, such as RAM, ROM, EEPROM, EPROM, flash memory devices, magnetic disks, etc., and combinations thereof. The memory 132 can store data 134 and instructions 136 which are executed by the processor 130 to cause vehicle computing system 106 to perform operations. In some implementations, the one or more processors 130 and at least one memory 132 may be comprised in one or more computing devices, such as computing device(s) 129, within the vehicle computing system 106.

In some implementations, vehicle computing system 106 can further include a positioning system 120. The positioning system 120 can determine a current position of the autonomous vehicle 102. The positioning system 120 can be any device or circuitry for analyzing the position of the autonomous vehicle 102. For example, the positioning system 120 can determine position by using one or more of inertial sensors, a satellite positioning system, based on IP address, by using triangulation and/or proximity to network access points or other network components (e.g., cellular towers, WiFi access points, etc.) and/or other suitable techniques for determining position. The position of the autonomous vehicle 102 can be used by various systems of the vehicle computing system 106.

As illustrated in FIG. 1, in some embodiments, the vehicle computing system 106 can include a perception system 110, a prediction system 112, and a motion planning system 114 that cooperate to perceive the surrounding environment of the autonomous vehicle 102 and determine a motion plan for controlling the motion of the autonomous vehicle 102 accordingly.

In particular, in some implementations, the perception system 110 can receive sensor data from the one or more sensors 104 that are coupled to or otherwise included within the autonomous vehicle 102. As examples, the one or more sensors 104 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 102.

As one example, for LIDAR system, the sensor data can include the location (e.g., in three-dimensional space relative to the LIDAR system) of a number of points that correspond to objects that have reflected a ranging laser. For example, LIDAR system can measure distances by measuring the Time of Flight (TOF) that it takes a short laser pulse to travel from the sensor to an object and back, calculating the distance from the known speed of light.

As another example, for RADAR system, the sensor data can include the location (e.g., in three-dimensional space relative to RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and speed. Thus, RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

Thus, the one or more sensors 104 can be used to collect sensor data that includes information that describes the location (e.g., in three-dimensional space relative to the autonomous vehicle 102) of points that correspond to objects within the surrounding environment of the autonomous vehicle 102.

In addition to the sensor data, the perception system 110 can retrieve or otherwise obtain map data 118 that provides detailed information about the surrounding environment of the autonomous vehicle 102. The map data 118 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 106 in comprehending and perceiving its surrounding environment and its relationship thereto.

The perception system 110 can identify one or more objects that are proximate to the autonomous vehicle 102 based on sensor data received from the one or more sensors 104 and/or the map data 118. In particular, in some implementations, the perception system 110 can determine, for each object, state data that describes a current state of such object. As examples, the state data for each object can describe an estimate of the object's: current location (also referred to as position); current speed; current heading (also referred to together as velocity); current acceleration; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 110 can determine state data for each object over a number of iterations. In particular, the perception system 110 can update the state data for each object at each iteration. Thus, the perception system 110 can detect and track objects (e.g., vehicles, pedestrians, bicycles, and the like) that are proximate to the autonomous vehicle 102 over time.

The prediction system 112 can receive the state data from the perception system 110 and predict one or more future locations for each object based on such state data. For example, the prediction system 112 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 114 can determine a motion plan for the autonomous vehicle 102 based at least in part on the predicted one or more future locations for the object provided by the prediction system 112 and/or the state data for the object provided by the perception system 110. Stated differently, given information about the current locations of objects and/or predicted future locations of proximate objects, the motion planning system 114 can determine a motion plan for the autonomous vehicle 102 that best navigates the autonomous vehicle 102 relative to the objects at such locations.

As one example, in some implementations, the motion planning system 114 can determine a cost function for each of one or more candidate motion plans for the autonomous vehicle 102 based at least in part on the current locations and/or predicted future locations of the objects. For example, the cost function can describe a cost (e.g., over time) of adhering to a particular candidate motion plan. For example, the cost described by a cost function can increase when the autonomous vehicle 102 approaches a possible impact with another object and/or deviates from a preferred pathway (e.g., a preapproved pathway).

Thus, given information about the current locations and/or predicted future locations of objects, the motion planning system 114 can determine a cost of adhering to a particular candidate pathway. The motion planning system 114 can select or determine a motion plan for the autonomous vehicle 102 based at least in part on the cost function(s). For example, the candidate motion plan that minimizes the cost function can be selected or otherwise determined. The motion planning system 114 can provide the selected motion plan to a vehicle controller 116 that controls one or more vehicle controls 108 (e.g., actuators or other devices that control gas flow, acceleration, steering, braking, etc.) to execute the selected motion plan.

In some implementations, the vehicle computing system 106 can include a Vehicle API client that can enable bidirectional communication with a service provider's system (e.g., an operations computing system) through a Vehicle API Platform operating on the service provider's system. For example, the Vehicle API Platform and the Vehicle API client can provide for establishing communication tunnels between the vehicle computing system and the service provider system. In some implementations, the Vehicle API client can provide for communicating data using intelligent quality of service (QoS), multiplexing data over different communication streams, prioritizing and/or de-prioritizing data traffic dynamically, for example, based on link conditions and/or the like.

Each of the perception system 110, the prediction system 112, and the motion planning system 114 can include computer logic utilized to provide desired functionality. In some implementations, each of the perception system 110, the prediction system 112, and the motion planning system 114 can be implemented in hardware, firmware, and/or software controlling a general purpose processor. For example, in some implementations, each of the perception system 110, the prediction system 112, and the motion planning system 114 includes program files stored on a storage device, loaded into a memory, and executed by one or more processors. In other implementations, each of the perception system 110, the prediction system 112, and the motion planning system 114 includes one or more sets of computer-executable instructions that are stored in a tangible computer-readable storage medium such as RAM hard disk or optical or magnetic media.

Figure 2:
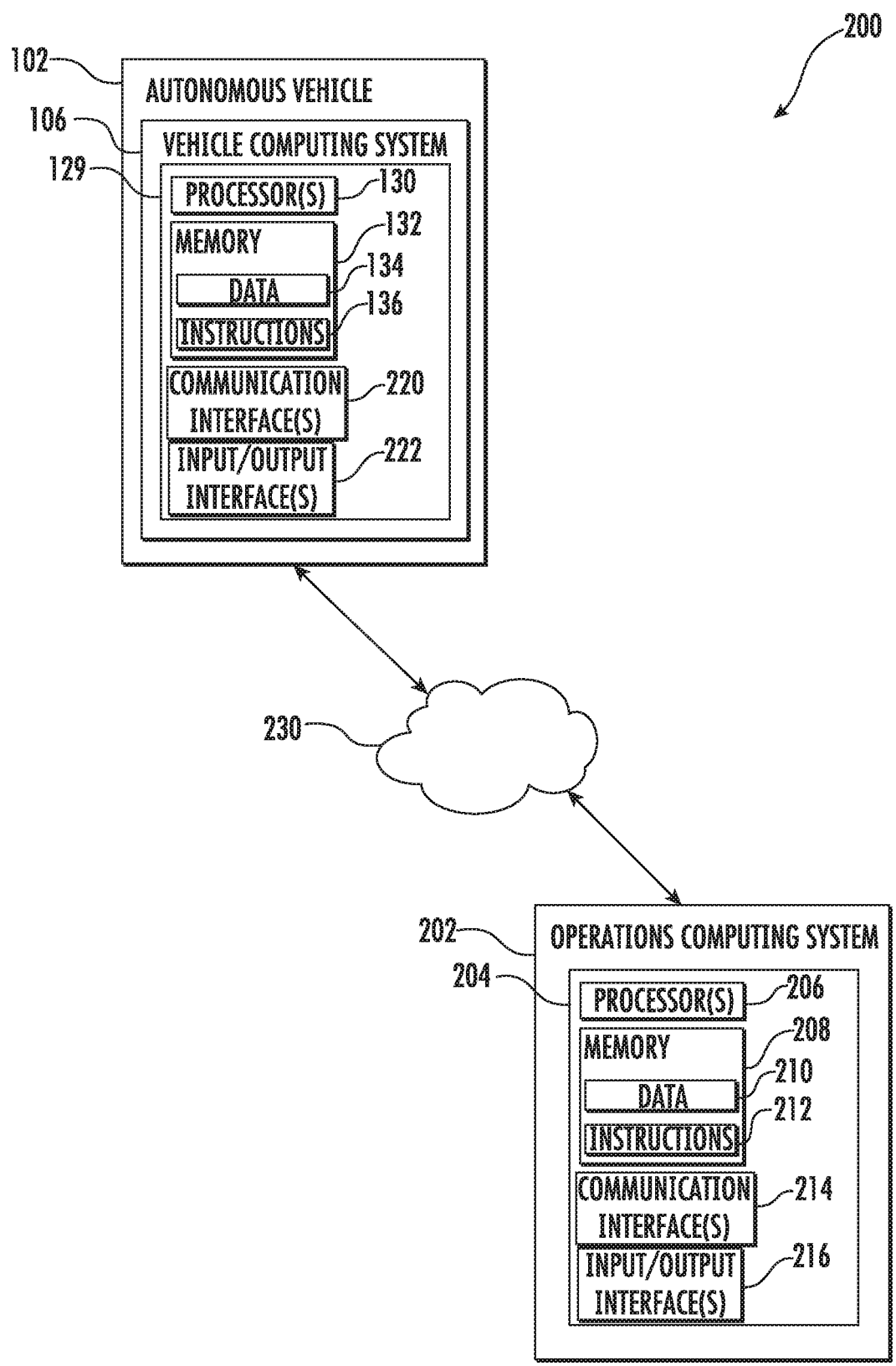
FIG. 2 depicts a block diagram of an example system according to example embodiments of the present disclosure.

FIG. 2 depicts a block diagram of an example system 200 according to example embodiments of the present disclosure. The example system 200 illustrated in FIG. 2 is provided as an example only. The components, systems, connections, and/or other aspects illustrated in FIG. 2 are optional and are provided as examples of what is possible, but not required, to implement the present disclosure. FIG. 2 illustrates an example system 200 including an operations computing system 202, and an autonomous vehicle 102 including vehicle computing system(s) 106 that can be communicatively coupled to one another over one or more network(s) 230 and can provide one or more operations in accordance with example embodiments of the systems and methods of the present disclosure.

As illustrated, the system 200 can include an operations computing system 202 which can provide for monitoring, communicating with, managing, etc. a fleet of vehicles, such as a fleet including one or more autonomous vehicles 102.

For example, the operations computing system 202 can communicate with one or more autonomous vehicles 102 to provide data associated with an application platform maintained by an entity, such as a ride sharing application platform, delivery service application platform, courier service application platform, and/or other service application platform. The operations computing system 202 can communicate with one or more vehicle computing systems 106 to provision services associated with the application platform. The operations computing system 202 can be associated with a central operations system and/or an entity associated with an autonomous vehicle and/or application platform such as, for example, a vehicle owner, vehicle manager, fleet operator, service provider, etc.

More particularly, the operations computing system 202 can include one or more computing device(s) 204 to perform operations associated with a vehicle fleet. The computing device(s) 204 can include one or more processor(s) 206 and at least one memory 208. The one or more processors 206 can be any suitable processing device (e.g., a processor core, a microprocessor, an ASIC, a FPGA, a controller, a microcontroller, etc.) and can be one processor or a plurality of processors that are operatively connected. The memory 208 can include one or more non-transitory computer-readable storage mediums, such as RAM, ROM, EEPROM, EPROM, flash memory devices, magnetic disks, etc., and combinations thereof.

The memory 208 can store data 210 and computer-readable instructions 212 which are executed by the processor 206 to cause the computing device(s) 204 to perform operations such as those described herein. The instructions 212 can be software written in any suitable programming language or can be implemented in hardware. Additionally, or alternatively, the instructions 212 can be executed in logically and/or virtually separate threads on processor(s) 206. For example, the memory 208 can store instructions 212 that when executed by the one or more processors 206 cause the one or more processors 206 to perform any of the operations and/or functions described herein, including, for example, one or more operations of FIG. 4. Additionally, in some implementations, the memory 208 can store data 210 which can include data such as described herein and the operations computing system 202 can provide at least some portion of the data to one or more remote computing systems, such as a vehicle computing system in an autonomous vehicle (e.g., vehicle computing system 106), for example.

In some implementations, the one or more processors 206 and at least one memory 208 may be comprised in one or more computing devices within the operations computing system 202. In some implementations, the operations computing system 202 can obtain data from one or more memory device(s) that are remote from the operations computing system 202.

The one or more computing device(s) 204 included in operations computing system 202 can also include one or more input/output interface(s) 216 that can be used to receive input, such as from a user, and provide output, such as for display or playback to a user. The input/output interface(s) 216 can include, for example, devices for receiving information from or providing information to a user, such as a display device, touch screen, touch pad, mouse, data entry keys, an audio output device such as one or more speakers, a microphone, haptic feedback device, etc. The input/output interface(s) 216 can be used, for example, by a user to control operation of the computing device(s) 204 included in operations computing system 202.

The computing device(s) 204 can also include one or more communication interface(s) 214 used to communicate with one or more systems or devices, including systems or devices that are remotely located from the computing device(s) 204, such as a vehicle computing system 106, and/or the like, for example. The communication interface(s) 214 can include any circuits, components, software, etc. for communicating with one or more networks (e.g., network 230). In some implementations, the communication interface(s) 214 can include, for example, one or more of a communications controller, receiver, transceiver, transmitter, port, conductors, software, and/or hardware for communicating data.

In some implementations, the operations computing system 202 can include one or more server computing devices. If the operations computing system 202 includes multiple server computing devices, such server computing devices can operate according to various computing architectures, including, for example, sequential computing architectures, parallel computing architectures, or some combination thereof.

In some implementations, the operations computing system 202 can include a Vehicle API platform that can provide for a translation/transport layer as an interface between vehicle computing systems onboard vehicles within an entity's fleet and one or more remote clients and/or applications operating within the entity's operations/control center. For example, the Vehicle API platform can receive data from a vehicle over a communications pipeline established between the Vehicle API and the vehicle (e.g., the vehicle computing system) and provide for different means of classifying the data, writing the data consistently on different messaging protocols, and providing a platform that can aggregate data for other clients/applications in consistent ways. The Vehicle API platform can provide for communicating vehicle data to the operations/control center in a secure manner that allows for expanded processing of vehicle data off the vehicle, analyzing such data in real time, and/or the like.

As further illustrated, the system 200 can include a vehicle computing system 106 included in an autonomous vehicle 102 that can provide operations for controlling an autonomous vehicle 102, for example as described in regard to FIG. 1. In some implementations, the vehicle computing system 106 can perform autonomous vehicle motion planning and enable operation of an autonomous vehicle, as described herein.

More particularly, the vehicle computing system 106 can include one or more computing device(s) 129 to perform operations associated with an autonomous vehicle. The computing device(s) 129 can include one or more processor(s) 130 and at least one memory 132. The one or more processor(s) 130 can be any suitable processing device (e.g., a processor core, a microprocessor, an ASIC, a FPGA, a controller, a microcontroller, etc.) and can be one processor or a plurality of processors that are operatively connected. The memory 132 can include one or more non-transitory computer-readable storage mediums, such as RAM, ROM, EEPROM, EPROM, flash memory devices, magnetic disks, etc., and combinations thereof.

The memory 132 can store data 134 and computer-readable instructions 136 which are executed by the processor(s) 130 to cause the computing device(s) 129 to perform operations such as described herein, including providing for communication with an operations computing system, for example. The instructions 136 can be software written in any suitable programming language or can be implemented in hardware. Additionally, or alternatively, the instructions 136 can be executed in logically and/or virtually separate threads on processor(s) 130. For example, the memory 132 can store instructions 136 that when executed by the one or more processor(s) 130 cause the one or more processor(s) 130 to perform any of the operations and/or functions described herein, including, for example, one or more operations of FIG. 4.

In some implementations, the one or more processor(s) 130 and at least one memory 132 may be comprised in one or more computing devices within the vehicle computing system 106. In some implementations, the vehicle computing system 106 can obtain data from one or more memory device(s) that are remote from the vehicle computing system 106.

The one or more computing device(s) 129 included in vehicle computing system 106 can also include one or more input/output interface(s) 222 that can be used to receive input, such as from a user, and provide output, such as for display or playback to a user. The input/output interface(s) 222 can include, for example, devices for receiving information from or providing information to a user, such as a display device, touch screen, touch pad, mouse, data entry keys, an audio output device such as one or more speakers, a microphone, haptic feedback device, etc. The input/output interface(s) 222 can be used, for example, by a user to control operation of the computing device(s) 129 included in vehicle computing system 106.

The computing device(s) 129 can also include one or more communication interface(s) 220 used to communicate with one or more systems or devices, including systems and devices on-board an autonomous vehicle as well as systems or devices that are remotely located from the computing device(s) 129 and/or the autonomous vehicle, such as operations computing system 202, and/or the like, for example. The communication interface(s) 220 can include any circuits, components, software, etc. for communicating with one or more networks (e.g., network 230). In some implementations, the communication interface(s) 220 can include, for example, one or more of a communications controller, receiver, transceiver, transmitter, port, conductors, software, and/or hardware for communicating data.

In some implementations, the vehicle computing system 106 can include a Vehicle API client that can enable bidirectional communication with a service provider's system, such as operations computing system 202, through a Vehicle API Platform operating on the operations computing system 202. For example, the Vehicle API Platform and the Vehicle API client can provide for establishing communication tunnels between the vehicle computing system and the operations computing system 202. In some implementations, the Vehicle API client can provide for communicating data using intelligent quality of service (QoS), multiplexing data over different communication streams, prioritizing and/or de-prioritizing data traffic dynamically, for example, based on link conditions and/or the like.

The network(s) 230 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 230 can be accomplished, for instance, via a communication interface using any type of protocol, protection scheme, encoding, format, packaging, etc.

Figure 3:
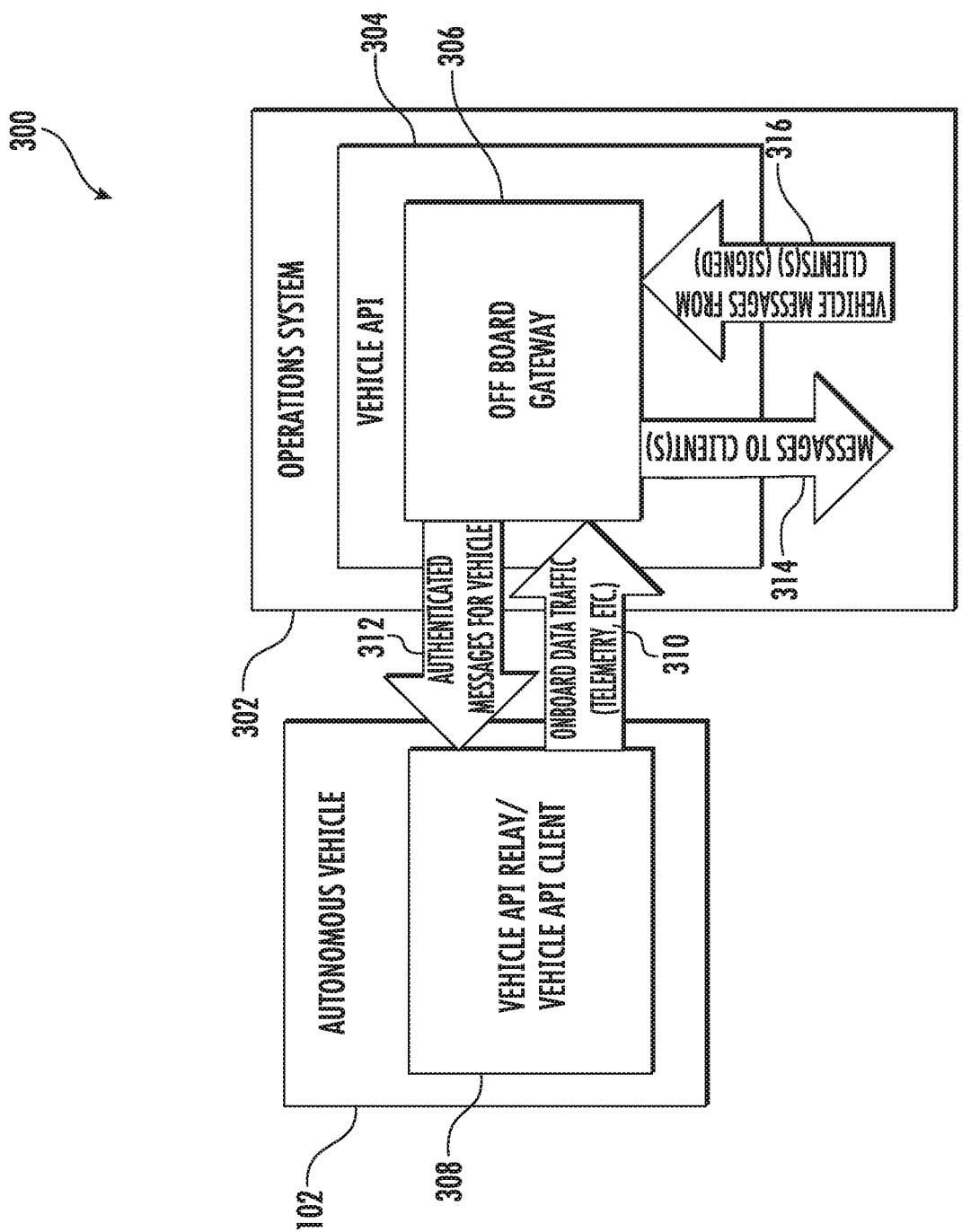
FIG. 3 depicts a block diagram of an example vehicle-operations system interface according to example embodiments of the present disclosure.

FIG. 3 depicts a block diagram of an example vehicle-operations system interface 300 according to example embodiments of the present disclosure. The systems and methods of the present disclosure can provide for secure, bidirectional communications between one or more vehicles in a service provider's fleet, such as an autonomous vehicle 102 and the service provider's operations or control center, such as operations computing system 302.

As illustrated in FIG. 3, the vehicle-operations system interface 300 can include a Vehicle API 304 associated with an operations system 302. The Vehicle API 304 can provide for a translation/transport layer as an interface between vehicle computing systems onboard vehicles within an entity's fleet (e.g., autonomous vehicle 102 and/or the like) and one or more remote clients and/or applications (e.g., fleet reporting, fleet management, fleet services/maintenance, remote vehicle assistance, routing, scheduling, etc.) operating within the entity's operations/control center (e.g., operations system 302).

The Vehicle API 304 can include an offboard gateway 306 which can provide for establishing one or more communication channels between the Vehicle API 304 and a vehicle, such as autonomous vehicle 102 (e.g., via vehicle computing system 106, etc.). The offboard gateway 306 can establish multiplexing connections between the vehicle 102 and the Vehicle API 304 that can be used to send arbitrary communications through the same connections.

In some implementations, the Vehicle API 304, through offboard gateway 306, can provide for establishing multiple hypertext transfer protocol (or other suitable protocol) connections, for example, using HTTP/2, between a Vehicle API relay/client 308 and the offboard gateway 306, allowing the ability to parallelize and assert traffic priority within a connection. In some implementations, the offboard gateway 306 of Vehicle API 304 can establish at least two hypertext transfer protocol (or other suitable protocol) connections, such as HTTP/2 connections, to the operations computing system from a vehicle, where at least one connection can be dedicated to high reliability, high deliverability traffic and at least one connection can be dedicated to best-effort, unguaranteed traffic. In some implementations, the use of multiple connections can allow for the underlying transport to be controlled in terms of different connections having different weights such that data can be identified as more important.

The vehicle 102 can include a Vehicle API relay/client 308, for example, associated with a vehicle computing system (e.g., vehicle computing system 106), which can provide for establishing the one or more communication channels between the offboard gateway 306 of the Vehicle API 304 and the vehicle 102. In some implementations, the Vehicle API relay/client 308 onboard the vehicle 102 can provide for communicating data using intelligent quality of service (QoS), multiplexing data over different communication streams, prioritizing and/or de-prioritizing data traffic dynamically, for example, based on link conditions and/or the like. In some implementations, the Vehicle API relay/client 308 can provide for making determinations about what data it thinks is more important and handling the communication of that data as appropriate.

In some implementations, the Vehicle API 304, through offboard gateway 306 and Vehicle API relay/client 308, can provide for communicating onboard data traffic 310 (e.g., telemetry, video, etc.) from the vehicle 102 to the operations system 302. For example, the offboard gateway 306 can receive the onboard data traffic 310 from the Vehicle API relay/client 308 and the Vehicle API 304 can provide for handling the onboard data traffic 310 and providing the onboard data traffic 310 to one or more clients and/or application (e.g., fleet reporting, fleet management, fleet services/maintenance, remote vehicle assistance, routing, scheduling, etc.) associated with the operations system 302 in client messages 314.

For example, in some implementations, the Vehicle API 304 can allow for a vehicle 102 to send multiple types of data to the operations system 302 over the established connections with the vehicle 102. For instance, in some implementations, the Vehicle API 304 can provide for a vehicle 102 sending a request for assistance to the operations system 302, such as in emergency or critical situations. In some implementations, the Vehicle API 304 can provide for a vehicle 102 to send low resolution perception data, such as labels and/or geometries, to the operations system, allowing for processing the data offboard the vehicle 102 by one or more clients/applications associated with the operations system 302 and allowing for developing a better understanding of the world. In some implementations, the Vehicle API 304 can provide for a vehicle to send data such as current vehicle pose (e.g., global and relative to map), vehicle trajectory, onboard diagnostics, video streams, and/or the like, to the operations system 302 to be processed by one or more clients/applications associated with the operations system 302, for example.

In some implementations, the Vehicle API 304, through offboard gateway 306 and Vehicle API relay/client 308, can provide for communicating authenticated vehicle messages 312 from the operations system 302 to the vehicle 102 (e.g., to a vehicle computing system, etc.). For example, the offboard gateway 306 can receive vehicle messages 316 from one or more clients/applications associated with the operations system 302 (e.g., messages signed by the client to allow for authenticating the messages before sending to a vehicle) and the Vehicle API 304 can provide for communicating the vehicle messages 316 to the vehicle 102, through offboard gateway 306 and Vehicle API relay/client 308, as authenticated messages 312 (e.g., once the Vehicle API 304 has authenticated the signed vehicle messages 316).

In some implementations, Vehicle API 304 can allow for the operations system 302 to provide multiple types of data to a vehicle 102 over the established connections to the vehicle 102. For example, in some implementations, the Vehicle API 304 can provide for sending high level assignment data to a vehicle 102, such as instructions for a vehicle to offload the data from its computing system, instructions for a vehicle to report for maintenance, instructions for a vehicle to procure fuel, and/or the like. In some implementations, the Vehicle API 304 can provide for sending emergency commands to a vehicle 102, for example, instructing the vehicle to immediately stop in an emergency or critical situation. In some implementations, the Vehicle API 304 can provide for sending specific control messages to a vehicle 102, for example, instructing the vehicle to go to certain coordinates. In some implementations, the Vehicle API 304 can provide for sending alerts and/or advisories to vehicles 102, for example, flagging particular geo regions, such as areas to avoid, areas to spend more time in to acquire passengers, areas under construction that should be routed around, and/or the like. In some implementations, such alerts and/or advisories can be developed based on the Vehicle API aggregating data for multiple vehicles within a fleet.

In some implementations, the Vehicle API 304 can provide for intelligently handling degraded communication situations between a vehicle 102 and an operations system 302, for example, by understanding the types of messages and prioritizing messages appropriately based on the current network conditions. In some implementations, the Vehicle API 304 can provide for dynamically prioritizing and/or de-prioritizing data (e.g., vehicle messages, onboard data, etc.) to provide for more efficiently transmitting the data.

The Vehicle API 304 can also provide for prioritizing communications on the offboard side (e.g., at the operations system 302). For example, in some implementations, when receiving a large amount of traffic, such as messages from a large number of vehicles, the Vehicle API 304 can understand the importance level of different messages and handle them appropriately, such as by classifying messages like requests for control/assistance as being more important than diagnostic information or traffic information, for instance.

Figure 4:
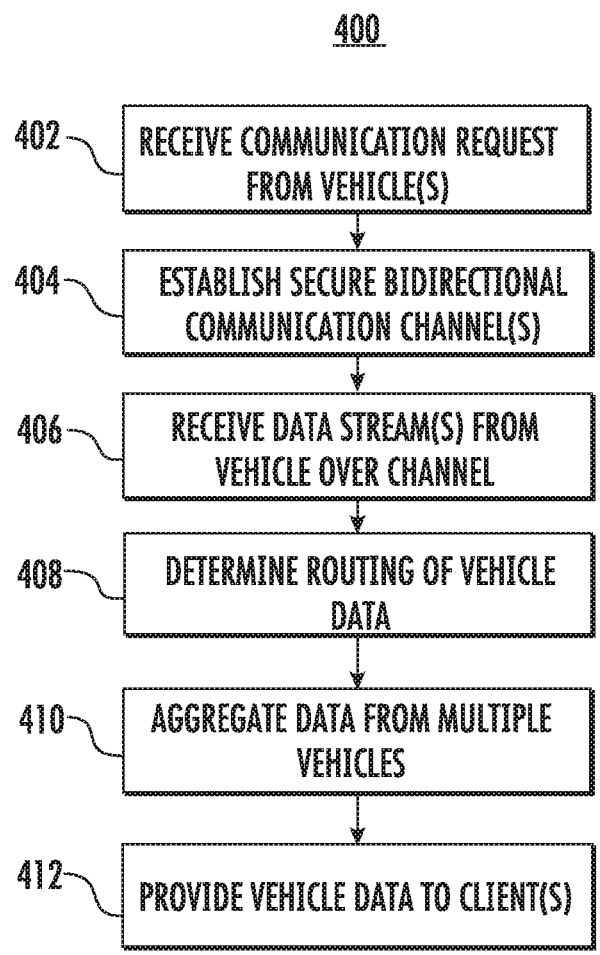
FIG. 4 depicts a flowchart diagram of example operations for communication between vehicles and an operations center according to example embodiments of the present disclosure.

FIG. 4 depicts a flowchart diagram of example operations 400 for communication between vehicles and an operations center according to example embodiments of the present disclosure. One or more portion(s) of the operations 400 can be implemented by one or more computing devices such as, for example, an operations computing system 202 of FIG. 2, the operations system 302 of FIG. 3, the vehicle computing system 106 of FIG. 1, and/or the like. Moreover, one or more portion(s) of the operations 400 can be implemented as an algorithm on the hardware components of the device(s) described herein (e.g., as in FIGS. 1, 2, and 3) to, for example, provide for secure, bidirectional communications between one or more vehicles in a service provider's fleet and the service provider's operations system.

At 402, one or more computing devices included within a computing system (e.g., an operations computing system 202, operations computing system 302, and/or the like) can obtain a communication request from a vehicle (e.g., autonomous vehicle 102 of FIG. 1 and/or the like). For example, a Vehicle API platform associated with the computing system can receive a request to establish communication between a vehicle and an operations computing system.

At 404, the computing system can establish one or more secure bidirectional channels between the computing system and the vehicle. For example, the Vehicle API platform can provide for establishing bidirectional communication tunnels between a vehicle and an operations computing system. In some implementations, the Vehicle API platform can establish multiplexing connections between the vehicle and the operations computing system that can be used to send arbitrary communications through the same connection. For example, in some implementations, the Vehicle API platform can provide for establishing multiple hypertext transfer protocol (or other suitable protocol) connections, for example, using HTTP/2, between a vehicle and the operations computing system, allowing the ability to parallelize and assert traffic priority within a connection. In some implementations, the Vehicle API platform can establish at least two hypertext transfer protocol (or other suitable protocol) connections, such as HTTP/2 connections, to the operations computing system from a vehicle, where at least one connection can be dedicated to high reliability, high deliverability traffic and at least one connection can be dedicated to best-effort, unguaranteed traffic. In some implementations, the use of multiple connections can allow for the underlying transport to be controlled in terms of different connections having different weights such that data can be identified as more important.

At 406, the computing system can receive one or more data streams from the vehicle over the one or more channels. For example, in some implementations, the one or more channels can provide for communicating vehicle data to an operations computing system in a secure manner that allows for expanded processing of vehicle data off the vehicle, analyzing such data in real time, and/or the like.

At 408, the computing system can determine routing of the received vehicle data, for example, to route vehicle data to one or more infrastructure endpoints (e.g., clients) associated with the operations computing system. For example, in some implementations, the computing system can receive data from a vehicle over the one or more channels established between the Vehicle API and the vehicle and provide for different means of classifying the data, writing the data consistently on different messaging protocols, and providing a platform that can route data for other clients/applications in consistent ways.

In some implementations, the Vehicle API platform can provide a more complex understanding of the vehicle data, for example, understanding the reason it is receiving/sending this data, understanding how different messages weigh against each other, and/or the like. For example, in some implementations, the Vehicle API platform can provide for intelligently handling degraded communication situations between a vehicle and a service provider's operations system, for example, by understanding the types of messages and prioritizing messages appropriately based on the current network conditions. In some implementations, the Vehicle API platform can provide for dynamically prioritizing and/or de-prioritizing data (e.g., vehicle messages) to provide for more efficiently transmitting the data.

At 410, the computing system can aggregate the data received over the one or more channels along with data received from other vehicles (e.g., other vehicles within the fleet communicating with the operations computing system over separately established channels).

For example, in some implementations, the Vehicle API platform can provide for aggregating data from multiple vehicles allowing for an understanding of what the vehicles are doing in that particular moment in time. In some implementations, the Vehicle API platform can provide for aggregating data from a vehicle to allow for determining what a particular vehicle is doing, to allow for tracking vehicle in real time, and/or the like. In some implementations, the Vehicle API platform can provide for streaming real time data from a vehicle, for example, providing a live stream of telemetry data from a vehicle to an operations system to allow for providing assistance to the vehicle. In some implementations, by providing for aggregating vehicle data, the Vehicle API platform can facilitate understanding of what all the vehicles are in a fleet, who they belong to, what they are doing, providing a history for some time window into the behavior of a vehicle, providing moving snapshots of vehicle data over time, and/or the like, for example.

At 412, the computing system can provide the received vehicle data to one or more clients associated with the operations computing system. For example, the Vehicle API can provide for providing vehicle data to the one or more clients associated with an operations computing system in a secure manner that allows for expanded processing of vehicle data off the vehicle, analyzing such data in real time, and/or the like. In some implementations, the computing system can further provide for relaying messages from one or more infrastructure endpoints (e.g., command/control messages, etc.) to the vehicle over the one or more channels.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for facilitating communication from and to a vehicle comprising:
    obtaining, by a computing system comprising one or more computing devices, a request to establish communication from a vehicle computing system;
    establishing, by the computing system, two or more communication connections to facilitate parallel data communication with the vehicle computing system, wherein the two or more communication connections have different weights for identifying an importance of vehicle data transported via each of the two or more communication connections;
    receiving, by the computing system from the vehicle computing system, one or more messages over at least one of the two or more communication connections, wherein transport of the one or more messages over the at least one of the two or more communication connections is dynamically prioritized based on the different weights of the two or more communication connections and one or more of types of the one or more received messages, the importance of vehicle data contained in the one or more messages, and current network conditions associated with the two or more communication connections;
    determining, by the computing system, routing for the one or more received messages; and
    providing, by the computing system, the one or more received messages to one or more clients based at least in part on the determined routing.

2. The computer-implemented method of claim 1, wherein establishing the two or more communication connections with the vehicle computing system comprises authenticating the vehicle computing system.

3. The computer-implemented method of claim 1, wherein establishing the two or more communication connections with the vehicle computing system comprises establishing at least two hypertext transfer protocol connections to the vehicle computing system.

4. The computer-implemented method of claim 3, wherein the at least two hypertext transfer protocol connections comprise HTTP/2 connections.

5. The computer-implemented method of claim 4, wherein at least one HTTP/2 connection is dedicated to high reliability traffic and at least one HTTP/2 connection is dedicated to best effort traffic.

6. The computer-implemented method of claim 1, wherein receiving one or more messages over at least one of the two or more communication connections comprises receiving messages based at least in part on a priority determined by the vehicle computing system.

7. The computer-implemented method of claim 1, wherein determining routing for the one or more received messages comprises re-prioritizing the one or more messages based at least in part on one or more current network conditions.

8. The computer-implemented method of claim 1, further comprising:
    aggregating, by the computing system, data comprising a plurality of messages from a plurality of vehicle computing systems; and
    providing, by the computing system, the aggregated data to the one or more clients.

9. A computing system comprising:
    one or more processors; and
    one or more memories including instructions that, when executed by the one or more processors, cause the one or more processors to perform operations, the operations comprising:
        obtaining a request to establish communication from a vehicle computing system;
        establishing two or more communication connections to facilitate parallel data communication with the vehicle computing system, wherein the two or more communication connections have different weights for identifying an importance of vehicle data transported via each of the two or more communication connections;
        receiving from the vehicle computing system one or more messages over at least one of the two or more communication connections, wherein transport of the one or more messages over the at least one of the two or more communication connections is dynamically prioritized based on the different weights of the two or more communication connections and one or more of types of the one or more received messages, the importance of vehicle data contained in the one or more messages, and current network conditions associated with the two or more communication connections;
        determining routing for the one or more received messages; and
        providing the one or more received messages to one or more clients based at least in part on the determined routing.

10. The computing system of claim 9, wherein establishing the two or more communication connections with the vehicle computing system comprises authenticating the vehicle computing system.

11. The computing system of claim 9, wherein establishing the two or more communication connections with the vehicle computing system comprises establishing at least two hypertext transfer protocol connections to the vehicle computing system.

12. The computing system of claim 11, wherein the at least two hypertext transfer protocol connections comprise HTTP/2 connections.

13. The computing system of claim 12, wherein at least one HTTP/2 connection is dedicated to high reliability traffic and at least one HTTP/2 connection is dedicated to best effort traffic.

14. The computing system of claim 9, wherein receiving from the vehicle computing system one or more messages over at least one of the two or more communication connections comprises receiving messages based in part on a priority determined by the vehicle computing system.

15. The computing system of claim 9, wherein determining routing for the one or more received messages comprises re-prioritizing the one or more messages based at least in part on one or more current network conditions.

16. The computing system of claim 9, the operations further comprising:
receiving one or more command/control messages for the vehicle computing system from the one or more clients; and
providing the one or more command/control messages to the vehicle computing system over the at least one of the two or more communication connections.

17. A system comprising:
one or more autonomous vehicles; and
an operations computing system;
the one or more autonomous vehicles comprising:
a vehicle computing system comprising:
one or more processors; and
one or more memories including instructions that, when executed by the one or more processors, cause the one or more processors to perform operations, the operations comprising:
sending a request to establish communication to the operations computing system;
establishing two or more communication connections to facilitate parallel data communication with the operations computing system, wherein the two or more communication connections have different weights for identifying an importance of vehicle data transported via each of the two or more communication connections;
determining priorities for one or more messages based on the different weights of the two or more communication connections and one or more of types of the one or more messages, the importance of vehicle data contained in the one or more messages, and current network conditions associated with the two or more communication connections; and
sending the one or more messages over at least one of the two or more communication connections to the operations computing system;
the operations computing system comprising:
one or more processors; and
one or more memories including instructions that, when executed by the one or more processors, cause the one or more processors to perform operations, the operations comprising:
obtaining the request to establish communication from the vehicle computing system;
establishing the two or more communication connections to facilitate the parallel data communication with the vehicle computing system;
receiving from the vehicle computing system the one or more messages over the at least one of the two or more communication connections;
determining routing for the one or more received messages; and
providing the one or more received messages to one or more clients based at least in part on the determined routing.

18. The system of claim 17, wherein establishing the two or more communication connections with the vehicle computing system comprises establishing at least two HTTP/2 connections to the vehicle computing system.

19. The system of claim 18, wherein at least one HTTP/2 connection is dedicated to high reliability traffic and at least one HTTP/2 connection is dedicated to best effort traffic.

20. The system of claim 17, wherein the operations computing system further comprises operations comprising:
receiving one or more command/control messages for the vehicle computing system from the one or more clients; and
providing the one or more command/control messages to the vehicle computing system over at least one of the two or more communication connections.

* * * * *